United States Patent
Watanabe

(10) Patent No.: US 10,131,277 B2
(45) Date of Patent: Nov. 20, 2018

(54) SURROUNDINGS MONITORING APPARATUS

(71) Applicant: AISIN SEIKI KABUSHIKI KAISHA, Kariya-shi, Aichi-ken (JP)

(72) Inventor: Kazuya Watanabe, Anjo (JP)

(73) Assignee: AISIN SEIKI KABUSHIKI KAISHA, Kariya-shi, Aichi-ken (JP)

(*) Notice: Subject to any disclaimer, the term of this patent is extended or adjusted under 35 U.S.C. 154(b) by 455 days.

(21) Appl. No.: 14/878,024

(22) Filed: Oct. 8, 2015

(65) Prior Publication Data

US 2016/0114727 A1    Apr. 28, 2016

(30) Foreign Application Priority Data

Oct. 28, 2014  (JP) ................. 2014-219609

(51) Int. Cl.
*H04N 7/18* (2006.01)
*B60R 1/00* (2006.01)
*G06K 9/00* (2006.01)

(52) U.S. Cl.
CPC ............ *B60R 1/00* (2013.01); *G06K 9/00805* (2013.01); *H04N 7/18* (2013.01); *H04N 7/181* (2013.01); *B60R 2300/605* (2013.01); *B60R 2300/802* (2013.01)

(58) Field of Classification Search
None
See application file for complete search history.

(56) References Cited

U.S. PATENT DOCUMENTS

| | | | |
|---|---|---|---|
| 2004/0257443 A1* | 12/2004 | Ueminami | B60R 1/00 348/148 |
| 2012/0263383 A1* | 10/2012 | Otuka | G06K 9/00798 382/195 |
| 2015/0002954 A1* | 1/2015 | Lynam | B60R 1/082 359/866 |
| 2015/0352956 A1* | 12/2015 | Miuchi | B60K 35/00 701/41 |

FOREIGN PATENT DOCUMENTS

| | | |
|---|---|---|
| JP | 2004-306886 A | 11/2004 |
| JP | 2005-191655 A | 7/2005 |

* cited by examiner

*Primary Examiner* — Janese Duley
(74) *Attorney, Agent, or Firm* — Sughrue Mion, PLLC

(57) ABSTRACT

A surroundings monitoring apparatus includes an acquisition portion acquiring captured image data from an imaging portion that captures an image of an area including a road surface in a moving direction of a vehicle and in a vicinity of the vehicle, and an output control portion outputting the captured image data acquired by the acquisition portion to a display device by switching a screen displayed at the display device to the captured image data based on one of a change of a pitch angle of the vehicle and a change of a gradient of the road surface on which the vehicle is driven.

12 Claims, 7 Drawing Sheets

F I G. 4
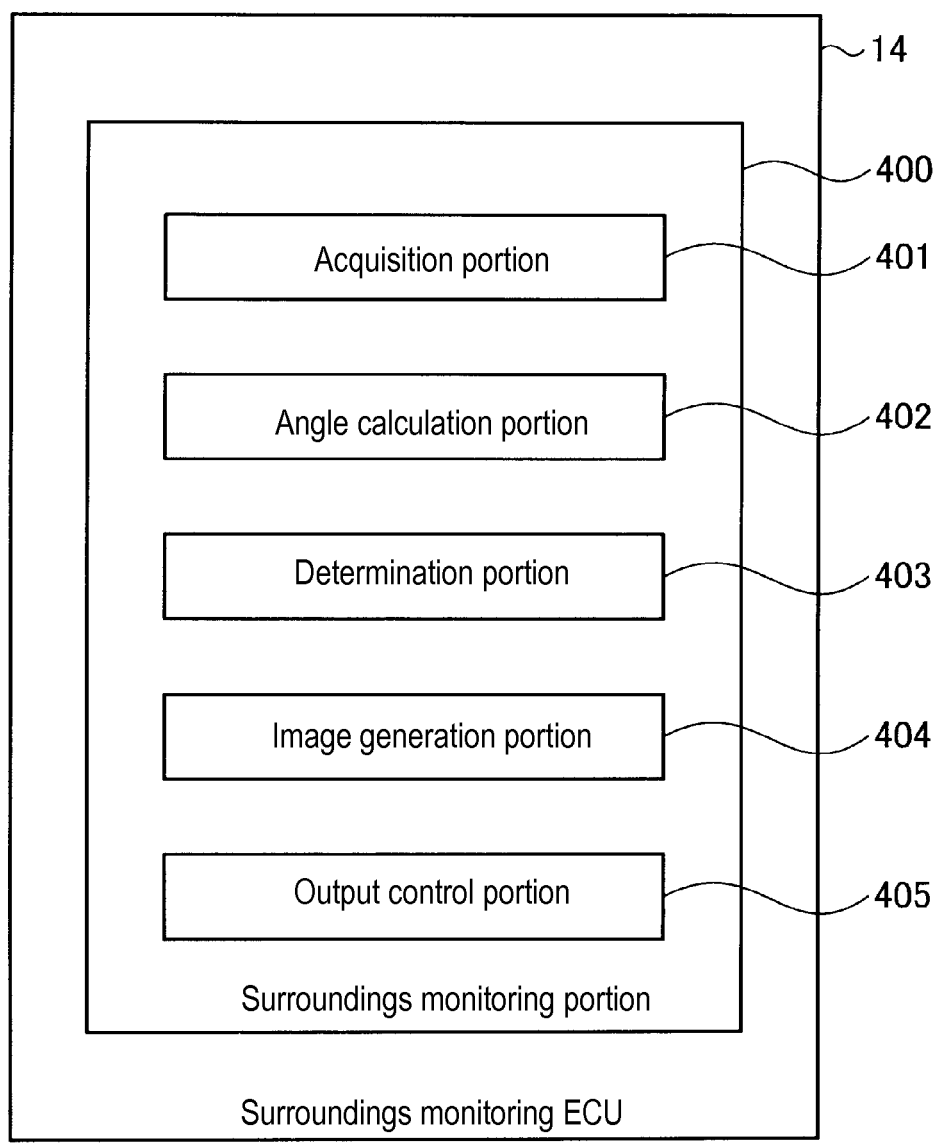

SURROUNDINGS MONITORING APPARATUS

CROSS REFERENCE TO RELATED APPLICATIONS

This application is based on and claims priority under 35 U.S.C. § 119 to Japanese Patent Application 2014-219609, filed on Oct. 28, 2014, the entire content of which is incorporated herein by reference.

TECHNICAL FIELD

This disclosure generally relates to a surroundings monitoring apparatus.

BACKGROUND DISCUSSION

According to a known technique for assisting a steering of a vehicle, image data captured as a surrounding environment (surrounding area) of the vehicle by a camera mounted at the vehicle is provided to a vehicle driver.

For example, JP2004-306886A (which is hereinafter referred to as Reference 1) discloses a technique for selectively showing and hiding the image data captured as the surrounding area of the vehicle (i.e., switching the image data to be shown and hidden) depending on a vehicle speed. In addition, JP2005-191655A (which is hereinafter referred to as Reference 2) discloses a technique for displaying the image data captured by an imaging portion in a way that the image data simulate images on a curved mirror at a right side and a curved mirror at a left side so that a state or a situation of the vehicle in a left-right direction is easily confirmed.

Further, as disclosed in References 1 and 2, for example, the image data is displayed as the surrounding area at a time when the vehicle speed is reduced or low and at a time when the vehicle passes through a point which is registered beforehand.

A place or a position which is difficult to be viewed by the driver exits on a road surface with a large variation in gradient (for example, a place where an uphill changes to a downhill). According to the known technique such as References 1 and 2, for example, the technique for confirming the state or the situation of the vehicle in the left-right direction is proposed, however, the captured image data is not displayed by considering the change of the gradient of the road surface in a moving direction of the vehicle. Further, timing at which the image data is displayed as the surrounding area is limited to depending on the vehicle speed, i.e., the image data is displayed at a time when the vehicle speed is reduced or low or at a time when the vehicle passes through a point which is registered beforehand, for example. The change of the gradient of the road surface is not considered accordingly.

Nevertheless, at the aforementioned road surface with a large variation in gradient, it is desirable to provide the image data captured as the surrounding area to the vehicle driver by considering the change of the gradient of the road surface in the moving direction of the vehicle.

A need thus exists for a surroundings monitoring apparatus which is not susceptible to the drawback mentioned above.

SUMMARY

According to an aspect of this disclosure, a surroundings monitoring apparatus includes an acquisition portion acquiring captured image data from an imaging portion that captures an image of an area including a road surface in a moving direction of a vehicle and in a vicinity of the vehicle, and an output control portion outputting the captured image data acquired by the acquisition portion to a display device by switching a screen displayed at the display device to the captured image data based on one of a change of a pitch angle of the vehicle and a change of a gradient of the road surface on which the vehicle is driven.

According to an another aspect of this disclosure, a surroundings monitoring apparatus includes an acquisition portion acquiring captured image data from an imaging portion that captures an image of an area including a road surface in a moving direction of a vehicle and in a vicinity of the vehicle, and an output control portion outputting the captured image data acquired by the acquisition portion to a display device based on one of a change of a pitch angle of the vehicle and a change of a gradient of the road surface on which the vehicle is driven.

BRIEF DESCRIPTION OF THE DRAWINGS

The foregoing and additional features and characteristics of this disclosure will become more apparent from the following detailed description considered with the reference to the accompanying drawings, wherein:

FIG. 4 is a block diagram illustrating a construction of a surroundings monitoring portion realized within a surroundings monitoring ECU according to the first embodiment;

DETAILED DESCRIPTION

In following embodiments, a vehicle 1 may be a car (an internal combustion engine car) including an internal combustion engine (an engine) as a driving source, a car (an electric car, a fuel cell car, or the like) including an electric motor (a motor) as the driving source, or a car (a hybrid car) including the engine and the motor as the driving sources, for example. In addition, the vehicle 1 may include various kinds of transmissions and various kinds of apparatuses (systems, parts and the like) necessary for driving the internal combustion engine or the electric motor. Further, method, quantity, layout and the like of an apparatus related to driving of wheels 3 of the vehicle 1 may be variously specified.

Figure 1:
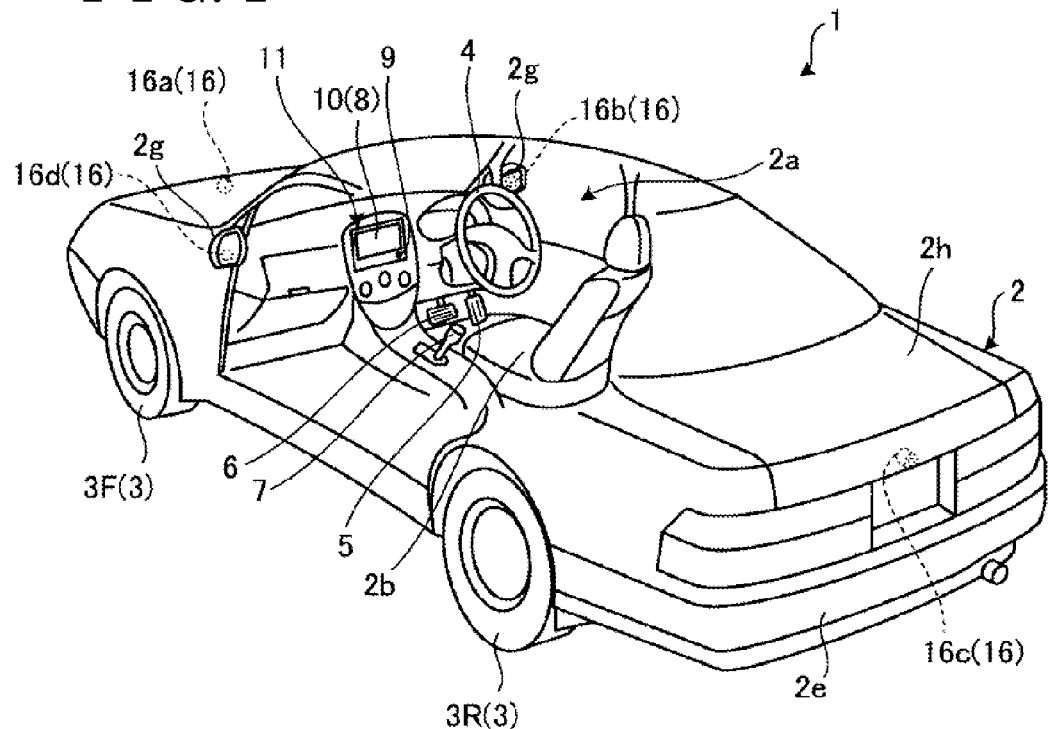
FIG. 1 is a perspective view of a vehicle where a portion of an interior is viewed in a perspective manner according to a first embodiment disclosed here.

A first embodiment is explained below. As illustrated in FIG. 1, a vehicle body 2 forms a vehicle interior 2a where a passenger gets in. A steering portion 4, an acceleration operating portion 5, a braking operating portion 6, a speed change operating portion 7 and the like are provided within the vehicle interior 2a in a state facing a seat 2b of a driver as the passenger. In the present embodiment, as an example, the steering portion 4 corresponds to a steering wheel projecting from a dashboard (instrument panel) and the acceleration operating portion 5 corresponds to an accelerator pedal positioned at the feet of the driver. The braking operating portion 6 corresponds to a brake pedal positioned at the feet of the driver and the speed change operating portion 7 corresponds to a shift lever projecting from a center console. The steering portion 4, the acceleration operating portion 5, the braking operating portion 6 and the speed change operating portion 7, however, are not limited to the aforementioned members.

A display device 8 (display output portion) and an audio output device 9 (audio output portion) are provided within the vehicle interior 2a. The display device 8 is, for example, a liquid crystal display (LCD), an organic electroluminescent display (OELD) and the like. The audio output device 9 is a speaker, for example. In the present embodiment, the display device 8 is covered by a clear operation input portion 10 (for example, a touch panel), for example. The passenger and the like may visually confirm a projected image (image) on a display screen (screen) of the display device 8 via the operation input portion 10. The passenger and the like may perform an operation input (instruction input) by operating the operation input portion 10, i.e., touching, pressing or moving the operation input portion 10 with one's finger, for example, at a position corresponding to the projected image (image) displayed on the display screen of the display device 8. In the present embodiment, for example, the display device 8, the audio output device 9, the operation input portion 10 and the like are provided at a monitor device 11 positioned at a center portion of the dashboard in a vehicle width direction (left-right direction). The monitor device 11 may include an operation input portion such as a switch, a dial, a joy-stick and a pressing button, for example. An audio output device may be provided at a position other than the position where the monitor device 11 is provided within the vehicle interior 2a. In addition, sound may be output from the audio output device 9 provided at the monitor device 11 and the other audio output device. In the present embodiment, for example, the monitor device 11 is shared by a navigation system and an audio system. Alternatively, a monitor device of a surroundings monitoring apparatus may be separately provided from the aforementioned systems.

Figure 2:
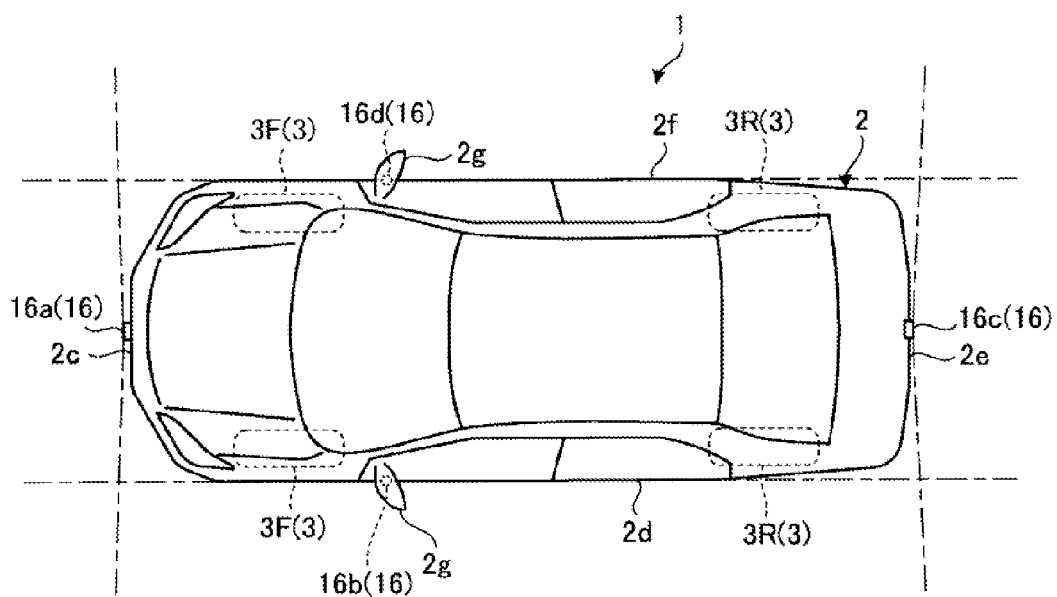
FIG. 2 is a plan view of the vehicle according to the first embodiment.
Figure 3:
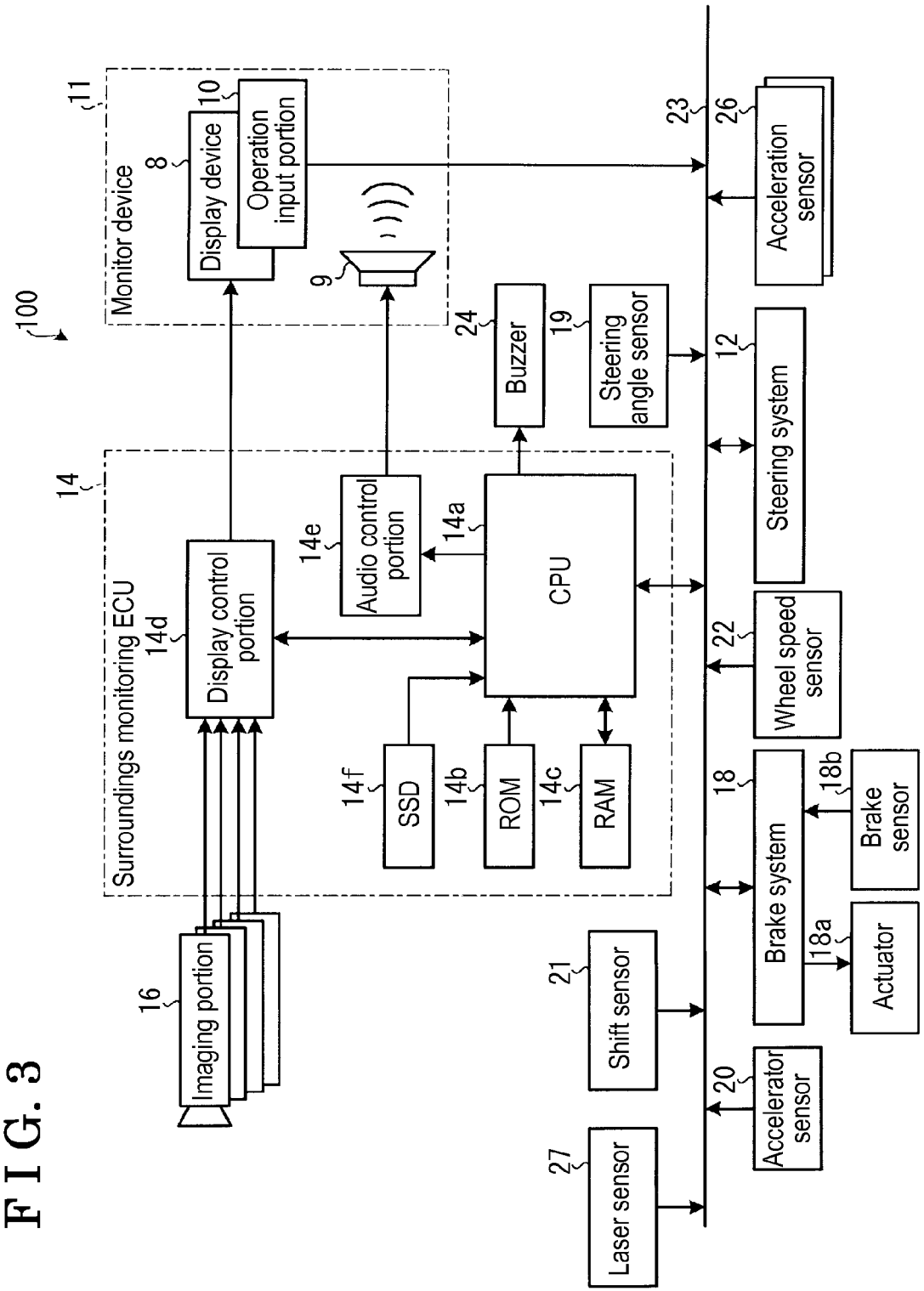
FIG. 3 is a block diagram illustrating an example of a surroundings monitoring apparatus of the vehicle according to the first embodiment.

As illustrated in FIGS. 1 and 2, in the present embodiment, the vehicle 1 is a four-wheel vehicle (four-wheel car), for example. The vehicle 1 includes two right and left front wheels 3F and two right and left rear wheels 3R. Further, in the present embodiment, these four wheels 3 are configured to be steered (capable of being steered). Specifically, as illustrated in FIG. 3, the vehicle 1 includes a steering system 12 selectively steering the front wheels 3F and the rear wheels 3R. The steering system 12 may concurrently steer the front wheels 3F and the rear wheels 3R.

In the present embodiment, plural (for example, four) imaging portions 16 (16a, 16b, 16c and 16d) are provided at the vehicle 1 (vehicle body 2), for example, as illustrated in FIG. 2. Each of the imaging portions 16 is, for example, a digital camera incorporating an imaging element such as a charge coupled device (CCD), a CMOS image sensor (CIS) and the like. The imaging portions 16 may output image data (moving image data, frame data) at a predetermined frame rate. Each of the imaging portions 16 includes a wide-angle lens to thereby take a picture in a range from 140° to 220°, for example, in a horizontal direction (view angle). An optical axis of the imaging portion 16 is specified to face downward (for example, in a vertical direction or in an obliquely downward direction). Thus, the imaging portion 16 takes a picture of outside environment around the vehicle body 2 including a road surface on which the vehicle 1 is movable.

In the embodiment, for example, the imaging portion 16a serving as a first imaging portion is positioned at an end portion 2c (an end portion in a plan view) at a front side (i.e., a front side in a vehicle front-rear direction) of the vehicle body 2 and is provided at a front bumper, for example. The imaging portion 16b serving as a second imaging portion is positioned at an end portion 2d at a left side (i.e., a left side in a vehicle width direction) of the vehicle body 2 and is provided at a door mirror 2g (projecting portion) at a left side. The imaging portion 16c serving as the first imaging portion is positioned at an end portion 2e at a rear side (i.e., a rear side in the vehicle front-rear direction) of the vehicle body 2 and is provided at a wall portion at a lower side of a door 2h of a rear trunk. The imaging portion 16d serving as the second imaging portion is positioned at an end portion 2f at a right side (i.e., a right side in the vehicle width direction) of the vehicle body 2 and is provided at a door mirror 2g (projecting portion) at a right side. In the present embodiment, the method of mounting the cameras at the vehicle is not limited and the cameras may be mounted so that the image data in a front direction, the image data in right and left side directions and the image data in a rear direction relative to the vehicle are obtainable.

A surroundings monitoring ECU 14 performs a calculation processing and an image processing based on the image data obtained by the plural imaging portions 16. The surroundings monitoring ECU 14 may display the image data on which the aforementioned processing is performed at the display device 8.

In a surroundings monitoring system 100 as illustrated in FIG. 3 according to the present embodiment, for example, a brake system 18, a steering angle sensor 19 (angular sensor), an accelerator sensor 20, a shift sensor 21, a wheel speed sensor 22, an acceleration sensor 26, and the like are electrically connected, in addition to the surroundings monitoring ECU 14, the monitor device 11, the steering system 12 and the like, via an in-vehicle network 23 (electric telecommunication line). The in-vehicle network 23 is configured as a controller area network (CAN), for example. The surroundings monitoring ECU 14 sends a control signal via the in-vehicle network 23 to control the steering system 12, the brake system 18 and the like. The surroundings monitoring ECU 14 may also receive detection results of an actuator 18a, a brake sensor 18b, the steering angle sensor 19 (for the front wheels 3F), the accelerator sensor 20, the shift sensor 21, the wheel speed sensor 22, the acceleration sensor 26 and the like and indicator signals (control signals, operation signals, input signals, data) of the operation input portion 10 and the like via the in-vehicle network 23.

In the present embodiment, the two acceleration sensors 26 are provided at the vehicle 1. In the embodiment, the vehicle 1 is equipped with an electronic stability control (ESC). The acceleration sensors 26 as conventionally mounted to the vehicle that is equipped with the ESC are employed. In the present embodiment, no restriction is made on the acceleration sensors 26. The sensor that is able to detect the acceleration in the left-right direction of the vehicle 1 is acceptable.

The acceleration sensors 26 detect accelerations of three axes. At least a roll angle and a pitch angle of the vehicle 1 can be derived by the acceleration sensors 26. Calculations of the roll angle and the pitch angle of the vehicle 1 are performed by the surroundings monitoring ECU 14.

The pitch angle is specified to be an angle indicating an inclination of the vehicle 1 around a left-right axis of the vehicle 1. In a case where the vehicle 1 is positioned on a horizontal plane (ground), the pitch angle is zero degrees.

The roll angle is an angle indicating an inclination of the vehicle 1 around a front-rear axis (i.e., longitudinal axis) of the vehicle 1. In a case where the vehicle 1 is positioned on the horizontal plane (ground), the roll angle is zero degrees.

A laser sensor 27 is provided at a front face of the vehicle 1 for detecting a position or a point where a gradient of a road surface on which the vehicle 1 is driven, i.e., gradient of a road surface in a moving direction (forward direction, travelling direction) of the vehicle 1, greatly changes and for detecting a distance to the aforementioned position or point.

The surroundings monitoring ECU 14 includes, for example a CPU 14a (central processing unit), a ROM 14b (read only memory), a RAM 14c (random access memory), a display control portion 14d, an audio control portion 14e, a SSD 14f (solid state drive, flush memory) and the like. The CPU 14a performs the image processing related to the image displayed at the display device 8 and the various calculation processing such as calculation of a moving path of the vehicle 1 and determination of whether or not interference with an object occurs, for example. The CPU 14a reads out program stored (installed) at a nonvolatile memory device such as the ROM 14b, for example, and performs the calculation processing based on the aforementioned program.

The RAM 14c tentatively stores various data used for the calculations at the CPU 14a. The display control portion 14d mainly performs the image processing using the image data obtained at the imaging portions 16 and the image processing (composition and the like, for example) of the image data displayed at the display device 8, for example, within the calculation processing at the surroundings monitoring ECU 14. In addition, the audio control portion 14e mainly performs processing of audio data output at the audio output device 9 within the calculation processing at the surroundings monitoring ECU 14. The SSD 14f is a rewritable nonvolatile memory portion that is able to store data even in a case where a power source of the surroundings monitoring ECU 14 is turned off. The CPU 14a, the ROM 14b, the RAM 14c and the like may be integrated within the same package. The surroundings monitoring ECU 14 may be configured to include other logic operation processor such as a DSP (digital signal processor) or a logic circuit, for example, than the CPU 14a. In addition, instead of the SSD 14f, a HDD (hard disk drive) may be provided. Further, the SSD 14f or the HDD may be provided separately from the surroundings monitoring ECU 14.

FIG. 4 is a block diagram illustrating a construction of a surroundings monitoring portion 400 realized within the surroundings monitoring ECU 14 according to the present embodiment. Each portion within the surroundings monitoring portion 400 illustrated in FIG. 4 is realized in a case where the CPU 14a configured as a part of the surroundings monitoring ECU 14 in FIG. 3 performs software stored within the ROM 14b.

The surroundings monitoring portion 400 realizes an acquisition portion 401, an angle acquisition portion 402, a determination portion 403, an image generation portion 404 and an output control portion 405 by performing software stored within the ROM 14b (i.e., computer readable storage medium). At this time, software (program) may be provided via other computer readable storage medium.

The surroundings monitoring portion 400 according to the present embodiment displays the image data by which circumstances (state, situation) around the vehicle 1 are recognizable at the display device 8 depending on the gradient of the road surface in a case where the vehicle 1 is driven on the road surface to thereby assist the driving of the driver.

Figure 5:
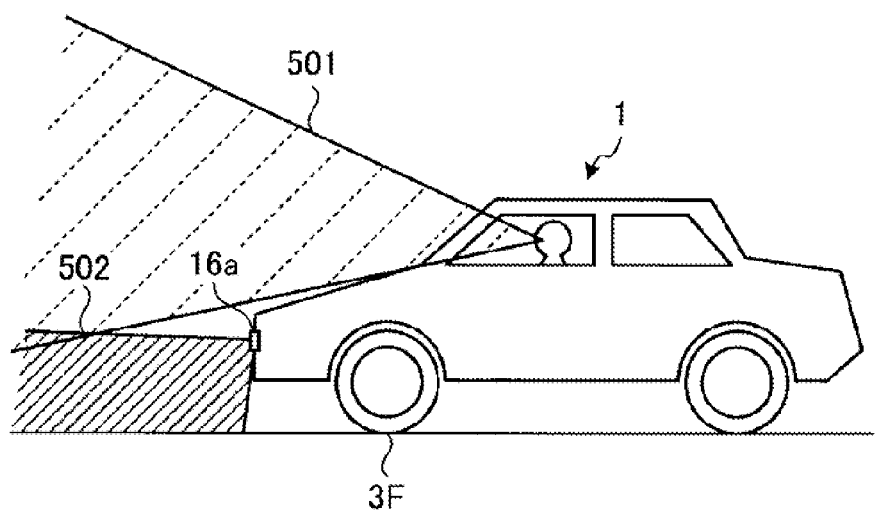
FIG. 5 is a diagram illustrating a difference between a field of vision of a driver in the vehicle and an imaging range of an imaging portion provided at a front face of the vehicle according to the first embodiment.

FIG. 5 is a diagram illustrating a difference between a field of vision of the driver in the vehicle 1 according to the present embodiment and an imaging range of the imaging portion 16a provided at the front face of the vehicle 1. As illustrated in FIG. 5, according to a driver's field of vision 501, the moving direction of the vehicle 1 is recognizable, however, an area in the vicinity of the vehicle 1 in the moving direction thereof cannot be viewed because the aforementioned area is hidden by the vehicle body, for example. On the other hand, in a case where the vehicle 1 is driven on a flat (horizontal or level) road surface, an imaging range 502 of the imaging portion 16a includes a range from the road surface positioned in a vertical direction to a horizontal line.

Because the driver continuously views the moving direction of the vehicle 1, the driver may understand the state of the road surface in the vicinity of the vehicle 1 in the moving direction at a position or a point where the road surface is flat (horizontal or level). In a case where the gradient of the road surface on which the vehicle 1 is driven changes, however, the driver may find a position or a point where the state of the road surface cannot be understood.

Figure 6:
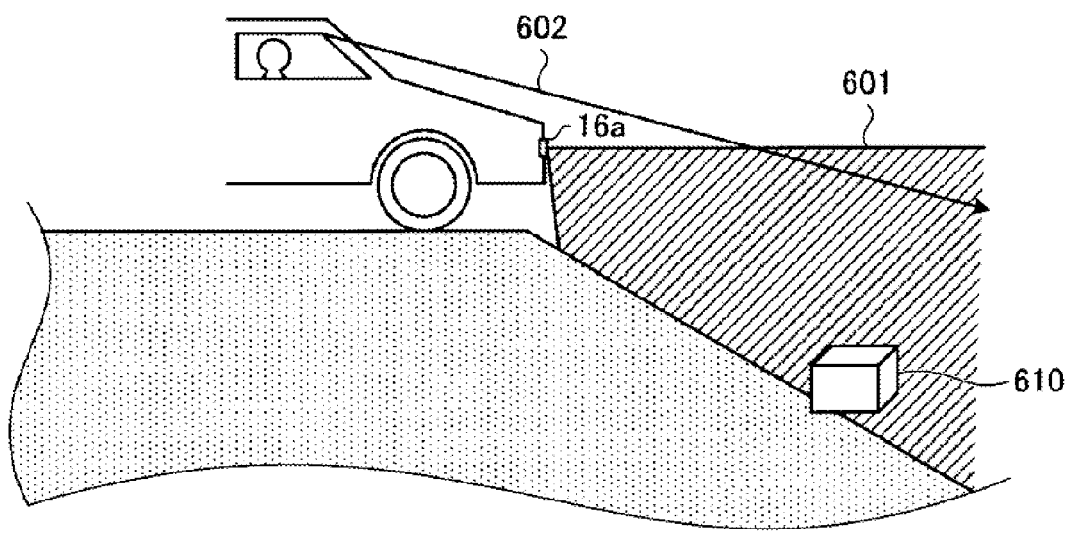
FIG. 6 is a diagram illustrating the imaging range of the imaging portion in a case where the slope of the road surface in a moving direction of the vehicle changes to a downslope.

FIG. 6 is a diagram illustrating the imaging range of the imaging portion 16a in a case where the slope of the road surface in the moving direction of the vehicle 1 changes to a downslope. As illustrated in FIG. 6, in a case where the slope of the road surface changes to the downslope, an obstacle 610 cannot be visually recognized on a basis of a driver's field of vision 602. Nevertheless, the obstacle 610 is included in an imaging area 601 of the imaging portion 16a.

Figure 7:
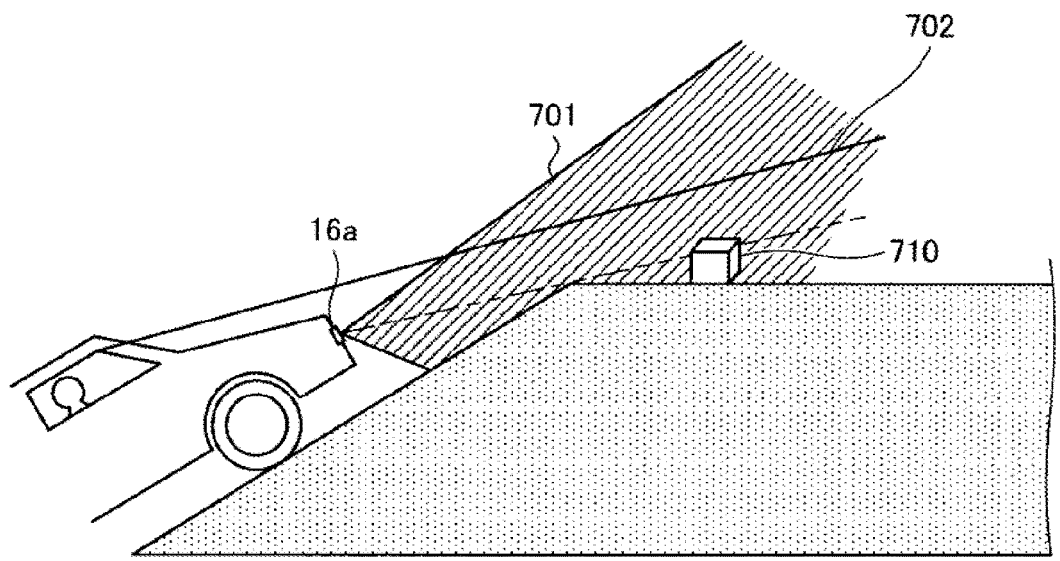
FIG. 7 is a diagram illustrating the imaging range of the imaging portion in a case where the slope of the road surface in the moving direction of the vehicle 1 changes to flat from an upslope.

FIG. 7 is a diagram illustrating the imaging range of the imaging portion 16a in a case where the slope of the road surface in the moving direction of the vehicle 1 changes to flat (horizontal or level) from an upslope. As illustrated in FIG. 7, in a case where the slope of the road surface changes to flat from the upslope, an obstacle 710 cannot be visually recognized on a basis of a driver's field of vision 702. Nevertheless, the obstacle 710 is included in an imaging area 701 of the imaging portion 16a.

Therefore, in the surroundings monitoring ECU 14, the image data (captured image data) captured by the imaging portion 16a is displayed at the display device 8 with the change of the road surface gradient serving as a trigger. Each portion within the surroundings monitoring portion 400 is explained with reference to FIG. 4.

The acquisition portion 401 acquires various information from various sensors, for example, provided at the vehicle 1. The acquisition portion 401 according to the present embodiment acquires the captured image data output from the imaging portions 16a, 16b, 16c and 16d provided at the vehicle 1 for capturing an image of a surrounding area of the vehicle 1. For example, the acquisition portion 401 acquires the captured image data output from the imaging portion 16a that captures the image of a region including the road surface in the moving direction of the vehicle 1 and in the vicinity of the vehicle 1.

The acquisition portion 401 also acquires acceleration data output from the acceleration sensors 26 provided at the vehicle 1. The acquisition portion 401 outputs the acquired information to the angle acquisition portion 402 and the image generation portion 404.

The acquisition portion 401 further acquires a speed of the vehicle 1 based on a wheel speed output from the wheel speed sensor 22.

The angle acquisition portion 402 acquires an inclination angle (i.e., pitch angle and roll angle, inclination information) of the vehicle 1 based on the acceleration data of the vehicle 1 output from the acceleration sensors 26. In the present embodiment, an example where the inclination angle of the vehicle 1 is calculated on a basis of the acceleration data output from the acceleration sensors 26 is explained, however, any method is applicable as long as the inclination angle of the vehicle 1 or the gradient of the road surface on which the vehicle 1 is driven is acquired.

The determination portion 403 determines, on a basis of the pitch angle of the vehicle 1 acquired by the angle acquisition portion 402, whether or not the change amount of the gradient of the road surface on which the vehicle 1 is driven during a predetermined time period (for example, five seconds) (passage of time) or while the vehicle is driven by a predetermined moving distance is equal to or greater than a first threshold value in an ascending direction. In addition, the determination portion 403 determines, on a basis of the pitch angle of the vehicle 1 acquired by the angle acquisition portion 402, whether or not the change amount of the gradient of the road surface on which the vehicle 1 is driven during the predetermined time period (for example, five seconds) or while the vehicle is driven by the predetermined moving distance is equal to or greater than a second threshold value in a descending direction. The first threshold value and the second threshold value each of which serves as a predetermined threshold value are specified in view of visibility from a driver's seat at the vehicle 1 according to the present embodiment.

Further, the determination portion 403 determines whether or not the speed of the vehicle 1 acquired by the acquisition portion 401 is equal to or smaller than a third threshold value (predetermined speed) in a case where it is determined that the change amount of the gradient of the road surface on which the vehicle 1 is driven is equal to or greater than the first threshold value in the ascending direction or is equal to or greater than the second threshold value in the descending direction. In a case where it is determined that the speed of the vehicle 1 is equal to or smaller than the third threshold value, the image generation portion 404 is instructed to generate the image data for the display at the display device 8.

That is, in a case where the speed of the vehicle 1 is low with the occurrence of the change of the gradient, it is regarded that the vehicle driver drives the vehicle 1 while confirming or checking the state of the surrounding area of the vehicle 1. Thus, the surroundings monitoring ECU 14 displays the captured image data of the imaging portion 16a at the display device 8. On the other hand, in a case where the speed of the vehicle 1 is high, it is regarded that the driver is not necessary to confirm the state of the surrounding area of the vehicle 1. Thus, the surroundings monitoring ECU 14 restrains displaying the captured image data of the imaging portion 16a at the display device 8.

After the captured image data of the imaging portion 16a is displayed at the display device 8, the determination portion 403 also determines whether or not to stop the display of the captured image data. In the present embodiment, the determination portion 403 determines that the display of the captured image data of the imaging portion 16a at the display device 8 is allowed to stop in a case where the gradient of the road surface on which the vehicle 1 is driven is horizontal and level or in a case where the vehicle 1 moves by or beyond a predetermined distance on the road surface that is descending (i.e., descending slope). After the stop of the display of the captured image data at the display device 8, any display screen (screen) of the display device 8 is acceptable. For example, a navigation screen may be displayed at the display device 8.

The image generation portion 404 generates the image data to be displayed at the display device 8 by combining the image data captured by the imaging portions 16 in accordance with an instruction from the determination portion 403 for generating the image data.

Figure 8:
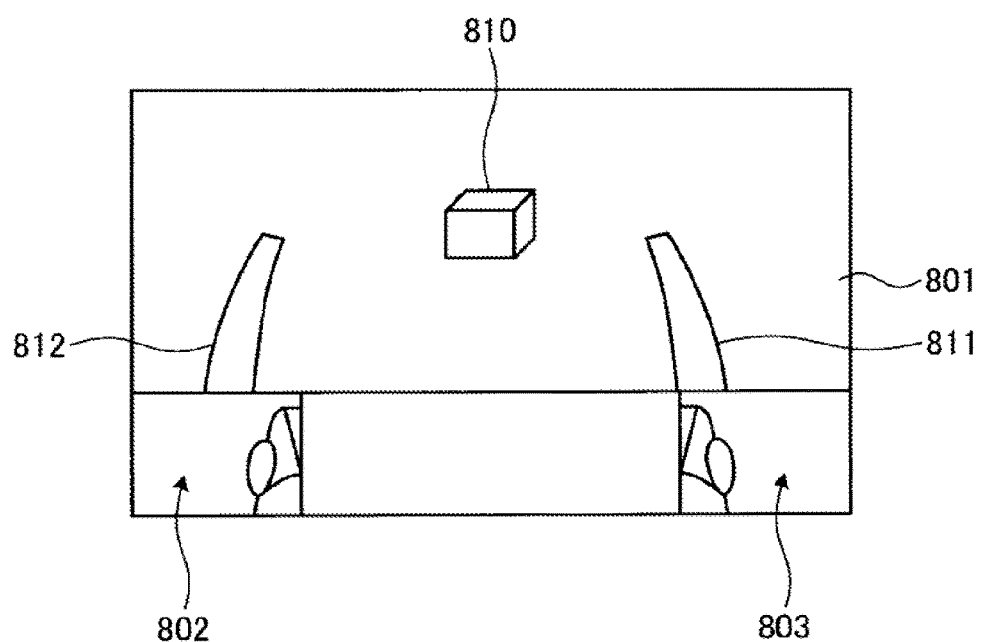
FIG. 8 is a diagram illustrating image data generated by an image generation portion according to the first embodiment.

FIG. 8 is a diagram illustrating the image data generated by the image generation portion 404. In FIG. 8, captured image data 801 captured by the imaging portion 16a, captured image data 802 captured by the imaging portion 16b, and captured image data 803 captured by the imaging portion 16c are combined. The captured image data 801 captured by the imaging portion 16a which is provided at the front face of the vehicle 1 includes an area in the vicinity of the front face of the vehicle 1. Thus, a position or a point which is difficult to be viewed by the driver may be easily confirmed by the captured image data 801. For example, an obstacle 810 in FIG. 8 is recognizable. The image generation portion 404 may indicate estimated moving loci 811 and 812 of the vehicle 1 at the captured image date 801.

The output control portion 405 outputs the image data displayed at the display device 8. For example, the output control portion 405 outputs the image data generated by the image generation portion 404 to the display device 8. Accordingly, the output control portion 405 outputs the captured image data acquired by the acquisition portion 401 to the display device 8 by switching the screen displayed at the display device 8 to the captured image data acquired by the acquisition portion 401 based on the change of the pitch angle of the vehicle 1 or the change of the gradient of the road surface on which the vehicle 1 is driven. In other words, the output control portion 405 outputs the captured image data acquired by the acquisition portion 401 to the display device 8 based on the change of the pitch angle of the vehicle 1 or the change of the gradient of the road surface on which the vehicle 1 is driven. In addition, as mentioned above, the output control portion 405 outputs the image data generated by the image generation portion 404 in a case where the speed of the vehicle 1 is equal to or smaller than the third threshold value. Thus, the driver may easily understand the state of the surrounding area of the vehicle in a case where the driver slowly drives the vehicle for securing safety and checks the state around the vehicle. As a result, the convenience for the driver may improve.

In addition, in a case where the gradient of the road surface on which the vehicle 1 is driven is horizontal and level or in a case where the vehicle moves by or beyond the predetermined distance on the descending road surface after the output control portion 405 starts outputting the captured image data acquired by the acquisition portion 401 to the display device 8, the output control portion 405 stops outputting the captured image data acquired by the acquisition portion 401 to the display device 8 in accordance with the determination result of the determination portion 403. Accordingly, in a case where the pitch angle or the gradient of the road surface on which the vehicle 1 is driven does not change for the predetermined time period, it is recognized that a position or a point which is difficult to be viewed by the driver is not present and the display of the captured image data captured by the imaging portions 16 is stopped. The screen for navigation, for example, may be displayed at the display device 8, which improves the convenience for the driver.

In a case where the vehicle 1 is driven on the road surface that is ascending (i.e., uphill), a position or a point that is difficult to be viewed by the driver is possibly present when the ascending road surface changes to the horizontal road surface or the descending road surface (i.e., downhill). Thus, the output control portion 405 continues outputting the image data generated by the image generation portion 404.

In the present embodiment, the pitch angle of the vehicle 1, i.e., the gradient of the road surface on which the vehicle 1 is driven, is detected on a basis of the acceleration acquired by the acceleration sensors 26. The method of detecting the pitch angle of the vehicle 1, i.e., the gradient of the road surface on which the vehicle 1 is driven, however, is not limited to the usage of the acceleration sensors 26. For example, changes of the horizontal line in the captured image data captured by an image analysis imaging portion is analyzed and, in a case where it is determined that the downhill or the like is approaching on a basis of the analysis result, the captured image data captured by the imaging portions 16 may be controlled to be displayed.

Figure 9:
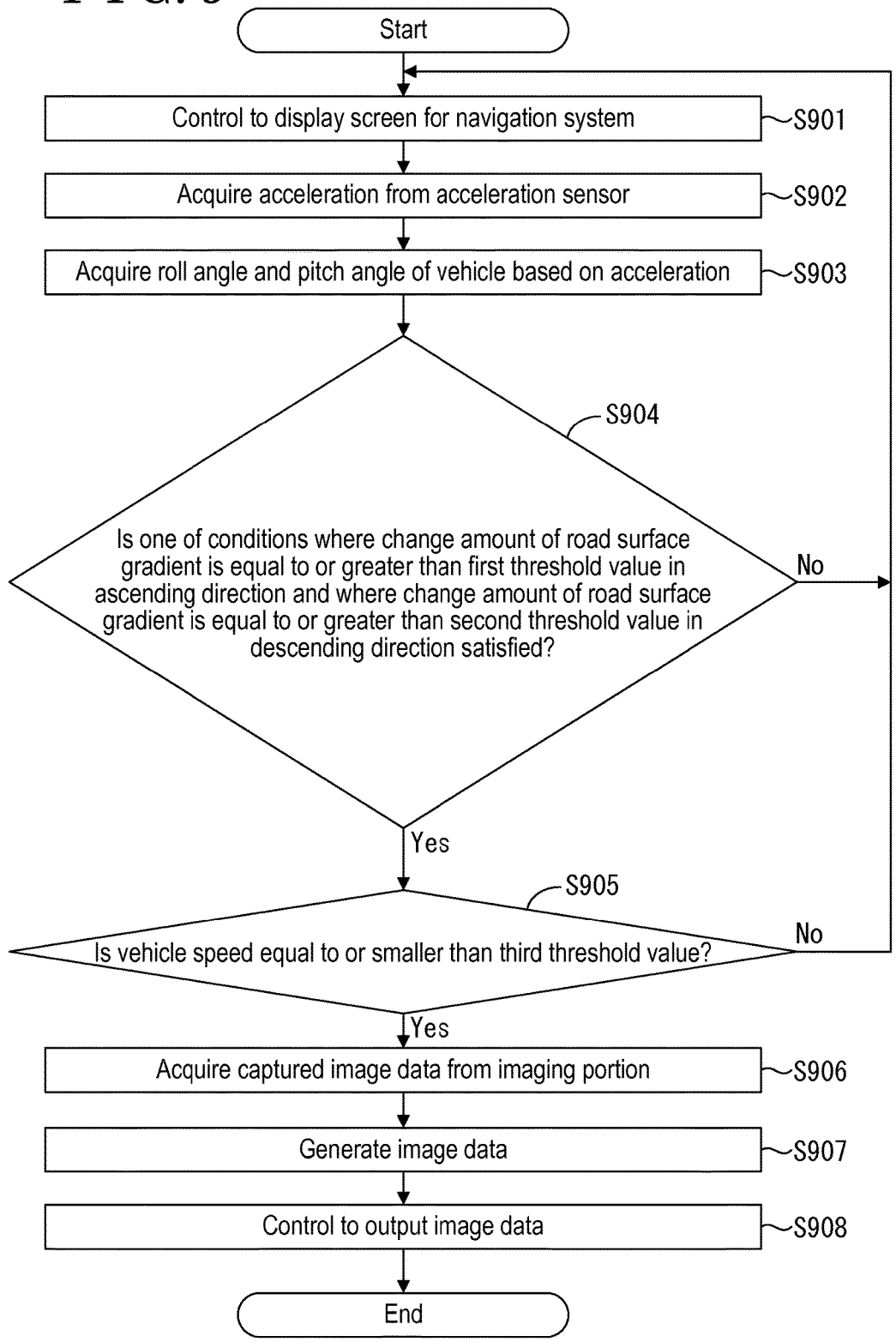
FIG. 9 is a flowchart illustrating procedures of an output process by the surroundings monitoring ECU for outputting the image data to a display device according to the first embodiment.

An output process of the image data to the display device 8 in the surroundings monitoring ECU 14 of the present embodiment is explained below. FIG. 9 is a flowchart indicating procedures of the output process in the surroundings monitoring ECU 14.

First, the output control portion 405 instructs or controls the display device 8 to output a screen for navigation of the vehicle 1 (step S901). Next, the acquisition portion 401 acquires the acceleration of the vehicle 1 from the acceleration sensors 26 (step S902).

The angle acquisition portion 402 calculates and acquires the roll angle and the pitch angle of the vehicle 1 based on the acceleration acquired by the acquisition portion 401 (step S903). In the present embodiment, the pitch angle of the vehicle 1 is regarded as corresponding to the gradient of the road surface.

Next, the determination portion 403 determines, on a basis of the pitch angle of the vehicle 1, whether or not one of conditions where the change amount of the gradient of the road surface on which the vehicle 1 is driven during the predetermined time period (for example, five seconds) or while the vehicle 1 is driven by the predetermined moving distance is equal to or greater than the first threshold value in the ascending direction and where the change amount of the gradient of the road surface on which the vehicle 1 is driven during the predetermined time period (for example, five seconds) or while the vehicle 1 is driven by the predetermined moving distance is equal to or greater than the second threshold value in the descending direction (step S904). That is, the determination portion 403 determines, on a basis of the pitch angle of the vehicle 1, whether or not change amount of the gradient of the road surface on which the vehicle 1 is driven during the predetermined time period (for example, five seconds) or while the vehicle 1 is driven by the predetermined moving distance is equal to or greater than the first threshold value in the ascending direction or equal to or greater than the second threshold value in the descending direction (step S904). In a case where it is determined that the change amount of the gradient of the road surface is not equal to or greater than the first threshold value in the ascending direction or not equal to or greater than the second threshold value in the descending direction (No in step S904), the process from step S901 is repeated.

On the other hand, in a case where the determination portion 403 determines that the change amount of the gradient of the road surface is equal to or greater than the first threshold value in the ascending direction or the change amount of the gradient of the road surface is equal to or greater than the second threshold value in the descending direction (Yes in step S904), it is determined whether or not the speed of the vehicle 1 is equal to or smaller than the third threshold value (step S905). In a case where it is determined that the speed of the vehicle 1 is greater than the third threshold value (No in step S905), the process from step S901 is repeated.

In a case where the determination portion 403 determines that the speed of the vehicle 1 is equal to or smaller than the third threshold value (Yes in step S905), the acquisition portion 401 acquires the captured image data from the imaging portions 16 (step S906).

Next, the image generation portion 404 generates the image data for the display at the display device 8 based on the acquired captured image data (step S907).

Thereafter, the output control portion 405 outputs the generated image data to the display device 8 (step S908).

According to the aforementioned procedures, in a state where the change of the road surface gradient occurs, the area in the moving direction of the vehicle 1 and in the vicinity of the vehicle 1 is displayed at the display device 8 in a case where the driver drives the vehicle 1 slowly while confirming the surrounding area of the vehicle 1.

In the first embodiment, the gradient of the road surface on which the vehicle 1 is driven is detected on a basis of the acceleration acquired by the acceleration sensors 26. The method of detecting the road surface gradient, however, is not limited to depending on the acceleration. Thus, in the second embodiment, an example where the road surface gradient is detected with a usage of the laser sensor 27 is explained. The construction of the second embodiment is the same as the first embodiment and thus a detailed explanation is omitted.

The acquisition portion 401 in the present embodiment acquires gradient information (inclination information) indicating the gradient of the road surface in the moving direction of the vehicle 1 from the laser sensor 27. At this time, a kwon method of acquiring the gradient information from the laser sensor 27 is employed and thus an explanation is omitted.

The angle acquisition portion 402 acquires the gradient information and the speed of the vehicle 1 from the acquisition portion 401. Then, the angle acquisition portion 402 detects a position or a point where the gradient of the road surface greatly changes on a basis of the gradient information acquired by the acquisition portion 401. Further, the angle acquisition portion 402 calculates a distance or an arrival time to the aforementioned position or point.

The angle acquisition portion 402 in the present embodiment detects a position or a point where the road surface gradient greatly changes on a basis of a gradient state of the road surface on which the vehicle 1 is presently driven. That is, the angle acquisition portion 402 detects a position or a point where the road surface that is horizontal or level changes to the road surface that is descending (i.e., downhill) in a case where the vehicle 1 is driven on the horizontal or level road surface, and also detects a position or a point where the road surface that is ascending (uphill) changes to the road surface that is horizontal or descending (downhill) in a case where the vehicle 1 is driven on the ascending road surface. Accordingly, regardless of the present state of the road surface on which the vehicle 1 is driven, the position or point where the gradient of the road surface changes is detectable.

The determination portion 403 determines whether or not the distance or the arrival time to the position where the gradient greatly changes, which is calculated by the angle acquisition portion 402, is equal to or smaller than a fourth threshold value.

Further, the determination portion 403 determines whether or not the speed of the vehicle 1 is equal to or smaller than the third threshold value in a case that the distance or the arrival time to the position where the gradient greatly changes is determined to be equal to or smaller than the fourth threshold value. When the speed of the vehicle 1 is determined to be equal to or smaller than the third threshold value, a control for displaying the image data at the display device 8 by combining the image data captured by the imaging portions 16 is performed.

In the present embodiment, before the gradient of the road surface on which the vehicle 1 is driven changes, the screen displayed at the display device 8 is switched so that the state of the road surface is shown on the display device 8. Thus, the driver may promptly recognize the state of the road surface so that an operation load of the driver may be reduced.

The conditions for restraining the display of the captured image data at the display device 8 obtained by combining the image data captured by the imaging portions 16 are the same as those of the first embodiment and an explanation is omitted.

In the second embodiment, the gradient of the road surface on which the vehicle 1 is driven is detected by the usage of the laser sensor 27. The detection of the gradient of the road surface, however, is not limited to the usage of the gradient information detected by the laser sensor 27 and may be achieved by analysis of the captured image data captured by the imaging portion 16*a* for recognizing the state of the road surface.

Further, the detection of the gradient of the road surface may be based on the gradient information per road surface in a case where the gradient information per route is included in map data for car navigation. For example, the determination portion may determine whether or not a distance or a required time to the upslope or downslope on the road surface on which the vehicle 1 is driven is equal to or smaller than a predetermined threshold value by referring to the aforementioned map data, and the captured image data captured by the imaging portion 16*a* may be displayed on a basis of the determination result.

In the present embodiment, the laser sensor 27 is used, however, a detection result of other sensors such as the acceleration sensors 26, for example, may be used in combination.

In addition, according to the aforementioned embodiments, the image data is displayed at the display device 8. Alternatively, the image data may be displayed at a head-up display.

Figure 10:
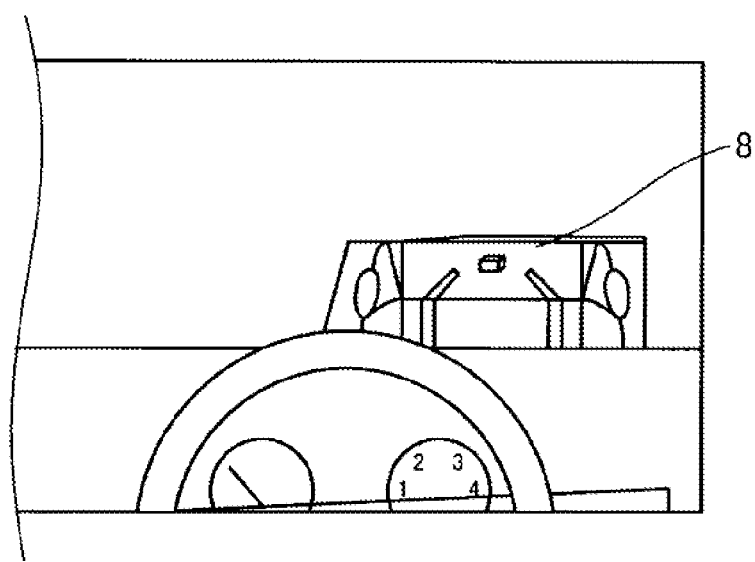
FIG. 10 a diagram illustrating a case where the display device is a head-up display.

FIG. 10 is a diagram illustrating a case where the display device 8 includes or corresponds to the head-up display. In a case where the display device 8 includes or corresponds to the head-up display, the driver confirms the state of the road surface in the vicinity of the vehicle 1 by the screen displayed at the display device 8 while directly visually confirming the road surface, thereby further reducing the operation load of the driver.

Further, in the aforementioned embodiments, the screen for navigation is normally displayed at the display device 8, and the display screen of the display device 8 is switched to the captured image data captured by the imaging portions 16 in a case where the gradient of the road surface changes. Instead of the aforementioned method, for example, the display device 8 may normally display the captured image data captured by the imaging portions 16, for example, and the area in the vicinity of the vehicle 1 including the road surface positioned in the vertical direction of the vehicle 1 within the captured image data captured by the imaging portions 16 may be displayed in an enlargement manner in a case where the surroundings monitoring ECU 114 detects the change of the gradient of the road surface. As a result, the same effects as the aforementioned first and second embodiments are obtainable.

According to the first and second embodiments and the alternatives thereof, in a case where the gradient of the road surface changes, a position or a point which is difficult to be viewed by the driver because of the change of the gradient of the road surface on which the vehicle 1 is driven is displayed at the display device 8. Thus, the surrounding area of the vehicle 1 may be easily viewed or conformed, which leads to a reduction of driving load of the driver.

The embodiments have been explained as above, however, the aforementioned embodiments are proposed as examples and may be appropriately modified or changed and performed in other various modes. Various omissions, replacements and changes may be appropriately made.

According to the aforementioned embodiments, the output control portion 405 switches the screen displayed at the display device 8 (display portion) to the captured image data acquired by the acquisition portion 401 from screen data for navigation of the vehicle 1 based on the change of the pitch angle of the vehicle 1 or the change of the gradient of the road surface on which the vehicle 1 is driven.

The output control portion 405 further switches the screen displayed at the display device 8 so that the area including the road surface on which the vehicle 1 is driven is displayed in an enlargement manner based on the change of the pitch angle of the vehicle 1 or the change of the gradient of the road surface on which the vehicle 1 is driven in a case where the captured image data captured by the imaging portions 16 is displayed at the display device 8 (display portion).

According to the aforementioned embodiments, for example, the driver may easily confirm the surrounding area of the vehicle.

According to the aforementioned embodiments, the output control portion 405 stops outputting the captured image data acquired by the acquisition portion 401 to the display device 8 in a case where one of the pitch angle of the vehicle 1 and the gradient of the road surface on which the vehicle 1 is driven is inhibited from changing for the predetermined time period after the display device 8 starts outputting the captured image data acquired by the acquisition portion 401.

Accordingly, because data and the like other than the captured image data acquired by the acquisition portion 401 is configured to be displayed at the screen of the display device 8, the convenience for the driver may improve.

In addition, according to the embodiments, the acquisition portion 401 acquires the speed of the vehicle 1, and the output control portion 405 outputs the captured image data acquired by the acquisition portion 401 to the display device 8 by switching the screen displayed at the display device 8 to the captured image data in a case where the speed of the vehicle 1 is equal to or smaller than the predetermined speed (third threshold value) in addition to a case where one of the pitch angle of the vehicle 1 and the gradient of the road surface on which the vehicle 1 is driven changes.

Accordingly, because the captured image data is displayed in a state where the driver desires to confirm the surrounding area of the vehicle 1, the confirmation of the surrounding area of the vehicle 1 may be easily conducted.

In the embodiments, the acquisition portion 401 acquires the inclination information indicating the inclination of the road surface on which the vehicle 1 is driven, and the output control portion 405 outputs the captured image data acquired by the acquisition portion 401 to the display device 8 by switching the screen displayed at the display device to the captured image data in a case where the change amount of the gradient of the road surface on which the vehicle 1 is driven is equal to or greater than the predetermined threshold value (the first threshold value or the second threshold value), the change amount being detected on a basis of the inclination information and the passage of time (predetermined time period).

Accordingly, because the captured image data is displayed in a state where the driver desires to confirm the surrounding area of the vehicle 1, the confirmation of the surrounding area of the vehicle 1 may be easily conducted.

In the embodiments, the acquisition portion 401 acquires the speed of the vehicle, and the output control portion 405 outputs the captured image data acquired by the acquisition portion 401 to the display device 8 in a case where the speed of the vehicle 1 is equal to or smaller than the predetermined speed (third threshold value) in addition to a case where one of the pitch angle of the vehicle 1 and the gradient of the road surface on which the vehicle 1 is driven changes.

Accordingly, because the captured image data is displayed in a state where the driver desires to confirm the surrounding area of the vehicle 1, the confirmation of the surrounding area of the vehicle 1 may be easily conducted.

In the embodiments, the acquisition portion 401 acquires the inclination information indicating the inclination of the road surface on which the vehicle 1 is driven, and the output control portion 405 outputs the captured image data acquired by the acquisition portion 401 to the display device 8 in a case where the change amount of the gradient of the road surface on which the vehicle 1 is driven is equal to or greater than the predetermined threshold value (the first threshold value or the second threshold value), the change amount being detected on a basis of the inclination information and the passage of time (predetermined time period).

Accordingly, because the captured image data is displayed in a state where the driver desires to confirm the surrounding area of the vehicle 1, the confirmation of the surrounding area of the vehicle 1 may be easily conducted.

In the embodiments, the screen displayed at the display device 8 is screen data for a navigation.

Accordingly, the convenience for the driver may improve.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A surroundings monitoring apparatus comprising:
an acquisition portion acquiring captured image data from an imaging portion that captures an image of an area including a road surface in a moving direction of a vehicle and in a vicinity of the vehicle and acquiring inclination information from a sensor, the inclination information indicating an inclination of the road surface on which the vehicle is driven; and
an output control portion starting outputting the captured image data acquired by the acquisition portion to a display device by switching a screen displayed at the display device to the captured image data in a case where a change amount of a gradient of the road surface on which the vehicle is driven is equal to or greater than a predetermined threshold value, the change amount being detected on a basis of the inclination and a passage of time, the predetermined threshold value based on a visibility from a driver's seat at the vehicle.

2. The surroundings monitoring apparatus according to claim 1, wherein the output control portion stops outputting the captured image data acquired by the acquisition portion to the display device in a case where the gradient of the road surface on which the vehicle is driven is inhibited from changing for a predetermined time period after the display device starts outputting the captured image data acquired by the acquisition portion.

3. The surroundings monitoring apparatus according to claim 1, wherein the acquisition portion acquires a speed of the vehicle, and the output control portion outputs the captured image data acquired by the acquisition portion to the display device by switching the screen displayed at the display device to the captured image data in a case where the speed of the vehicle is equal to or smaller than a predetermined speed in addition to a case where the gradient of the road surface on which the vehicle is driven changes.

4. The surroundings monitoring apparatus according to claim 2, wherein the acquisition portion acquires a speed of the vehicle, and the output control portion outputs the captured image data acquired by the acquisition portion to the display device by switching the screen displayed at the display device to the captured image data in a case where the speed of the vehicle is equal to or smaller than a predetermined speed in addition to a case where the gradient of the road surface on which the vehicle is driven changes.

5. A surroundings monitoring apparatus comprising:
an acquisition portion acquiring captured image data from an imaging portion that captures an image of an area including a road surface in a moving direction of a vehicle and in a vicinity of the vehicle and acquiring inclination information from a sensor the inclination information indicating an inclination of the road surface on which the vehicle is driven; and
an output control portion starting outputting the captured image data acquired by the acquisition portion to a display device in a case where a change amount of a gradient of the road surface on which the vehicle is driven is equal to or greater than a predetermined threshold value, the change amount being detected on a basis of the inclination information and a passage of time, the predetermined threshold value being based on a visibility from a driver's seat at the vehicle.

6. The surroundings monitoring apparatus according to claim 5, wherein the output control portion stops outputting the captured image data acquired by the acquisition portion to the display device in a case where the gradient of the road surface on which the vehicle is driven is inhibited from changing for a predetermined time period after the display device starts outputting the captured image data acquired by the acquisition portion.

7. The surroundings monitoring apparatus according to claim 5, wherein the acquisition portion acquires a speed of the vehicle, and the output control portion outputs the captured image data acquired by the acquisition portion to the display device in a case where the speed of the vehicle is equal to or smaller than a predetermined speed in addition to a case where the gradient of the road surface on which the vehicle is driven changes.

8. The surroundings monitoring apparatus according to claim 6, wherein the acquisition portion acquires a speed of the vehicle, and the output control portion outputs the captured image data acquired by the acquisition portion to the display device in a case where the speed of the vehicle is equal to or smaller than a predetermined speed in addition to a case where the gradient of the road surface on which the vehicle is driven changes.

9. The surroundings monitoring apparatus according to claim 1, wherein the screen displayed at the display device is screen data for a navigation.

10. The surroundings monitoring apparatus according to claim 2, wherein the screen displayed at the display device is screen data for a navigation.

11. The surroundings monitoring apparatus according to claim 3, wherein the screen displayed at the display device is screen data for a navigation.

12. The surroundings monitoring apparatus according to claim 1, wherein the output control portion starts outputting an enlargement image data in the case where the change amount of the gradient of the road surface on which the vehicle is driven is equal to or greater than the predetermined threshold value while the captured image data is displayed at the display device, the enlargement image data being enlarged an area in the road surface on which the vehicle is driven within the captured image data captured by the imaging portion.

* * * * *